United States Patent [19]

Specht

[11] 3,957,147
[45] May 18, 1976

[54] ROLLER FOR CONVEYOR APPARATUS

[75] Inventor: Dieter Specht, Dhunn, Germany

[73] Assignee: Interroll Fordertechnik GmbH & Co. KG, Dhunn, Germany

[22] Filed: July 22, 1974

[21] Appl. No.: 490,370

[30] Foreign Application Priority Data

Aug. 1, 1973 Germany............................ 2338950

[52] U.S. Cl..................................... 193/37; 308/20; 308/187; 308/187.1
[51] Int. Cl.².................... B65G 39/09; F16C 35/00
[58] Field of Search.............. 193/35 R, 37; 308/20, 308/187, 187.1, 216, 235, 36.1; 198/127 R; 29/110, 116; 277/133

[56] References Cited
UNITED STATES PATENTS

| | | | |
|---|---|---|---|
| 1,014,106 | 1/1912 | Wentz............................... | 308/20 X |
| 1,300,590 | 4/1919 | Donald............................. | 193/37 X |
| 1,793,190 | 2/1931 | Philips........................ | 308/187.1 X |
| 1,793,346 | 2/1931 | Wego.................................... | 308/20 |
| 2,074,901 | 3/1937 | Gotthardt........................ | 308/20 X |
| 3,144,280 | 8/1964 | Sorenson......................... | 277/133 X |
| 3,362,760 | 1/1968 | Sernetz............................ | 308/187.1 |

FOREIGN PATENTS OR APPLICATIONS 1,193,309   5/1970   United Kingdom.................. 308/20

*Primary Examiner*—Evon C. Blunk
*Assistant Examiner*—James L. Rowland

[57] ABSTRACT

This invention relates to a roller for a conveying apparatus, the roller consisting of a tubular casing, a roller bottom in each end, and a dust cover inserted into each roller bottom and being so designed as to limit the entrance of water into the roller casing.

4 Claims, 2 Drawing Figures

ROLLER FOR CONVEYOR APPARATUS

This invention relates to a roller apparatus for use in conveyor installations, roller trains, continuously-running shelves, and the like. The apparatus involves a tubular roller casing, which is rotatably mounted on an axle on roller bearings by means of roller bottoms inserted into its two ends, while two dust covers are provided which are insertable into the two roller bottoms.

Various forms of rollers of this general type in metal and/or plastic are known in the art. When such rollers are used in moist atmospheres, for example in rooms with a high degree of air moisture, or when used in conveying wet objects, there exists the danger that water will penetrate through the axle holes of the roller bottoms into the inside of the rollers, where the water may harm the rollers and axles, harm or destroy the roller bearings and may also in some cases lead to the imbalance of the roller. Attempts are therefore being made to prevent the entry of water into the inside of the roller, in connection with which labyrinth packings and the like have been used.

The object of the present invention is to provide a roller for conveyor installations, the roller bottoms of which can be made preferably of plastic, but also of metal, and the construction of which securely prevents the entry of water into the roller bearing and into the inside of the roller. At the same time, it is an objective that the roller shall be such as to be simple and economical in construction, and be, in terms of its possibilities of application, outstandingly flexible, strong and with long-life, and finally also having a high loading capacity.

According to the invention, an annular flange is formed on the roller bottoms surrounding the axle. The angular flange, which is an integral part of the roller bottom, extends axially outwards, angled radially outwards at the free end, to act as a water deflector.

It is possible, without difficulty, to make a plastic composition roller bottom with an integral water-deflecting annular flange, as an injection-moulded part. When using metal, it is also possible to make such a roller bottom simply, if the metal roller bottom has according to the invention, a Z-shaped cross-section, with one flange of the Z engaging the roller casing and the other flange of the Z forming the annular flange and adapted to accommodate the external roller bearing ring.

The dust cover preferably includes an axially inwardly extending annular flange, the free end of which is applied resiliently against the internal side of the water-deflecting annular flange of the respective roller bottom.

In one embodiment, the dust cover has a semi-cross-section of substantially E shape, with the extra-long E flange nearest to the axle adapted to engage the axle and carry the internal roller bearing ring.

The annular flange of the dust cover, the E flange of the dust cover near the axle, the E-strap of the dust cover, and the roller bearing surround a ring-shaped grease chamber, which constitutes additionally security against the entry of water and dust into the roller bearing.

The plastic roller bottoms have a radial annular flange extending over the internal side of the roller bearings.

The objects, characteristics and advantages of the invention may be seen from the following description which serves to illustrate the scope of the invention without limiting it, reference being made to the attached drawings in which.

Figures 1, 2:
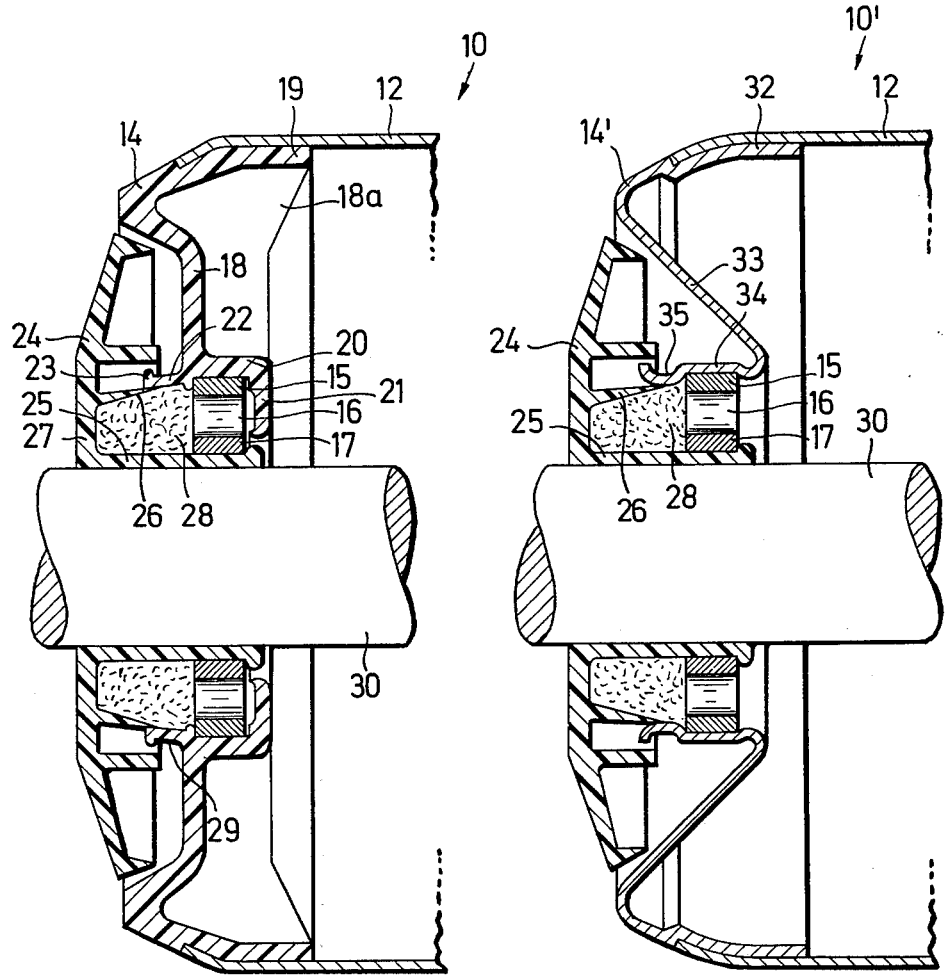
FIG. 1 is a cross-section through one end of a roller according to the invention using plastic roller bottoms.
FIG. 2 is a cross-section corresponding to that of FIG. 1 using metal roller bottoms.

The roller generally denoted by 10 in FIG. 1 consists in a roller casing 12, which may be, for example, a metal tube, in the two ends of which (only one end has been represented) a roller bottom generally denoted by 14 is arranged in each instance and which, in the embodiment shown in FIG. 1, is made of plastic. The roller bottom 14 consists of a curved radial strap 18, with a flange 19 on the outer periphery, engaging so as to fit in the end of the roller casing 12. The roller bottom also includes an internal flange ring 20 which secures the external portion of roller bearing 15 by resilient deformation. A radial annular flange 21 connecting the flange ring 20 grips behind the roller bearing 15, 16, 17, and closes it off with respect to the inside of the roller. Radial straps 18a impart rigidity to the roller bottom 14.

An axially-projecting water-deflector annular flange 22 is formed on the external side of the strap 18 substantially at the level of the external roller bearing ring 15; the free end 23 of the flange is bent radially outwards, in such a manner as to produce a water channel 29 which serves to disperse or carry away any water that has entered the axle area, when the assembly is rotating.

A dust cover generally denoted by 24 has, when viewed in semi-cross-section, a substantially E shape, with the internal E-flange 25 considerably extended and fitting onto the axle 30. The flange 25 bears and holds the internal roller bearing ring 17. An annular flange 26 extends inwardly from the bottom E-flange portion 27 of the dust cover 24, and it applies with its free end resiliently against the internal side of the water-deflector annular flange 22. In this manner, between the dust cover and the roller bottom, i.e., between the parts 15, 17, 22, 25, 26, 27, an annular space is surrounded which is appropriately provided with a grease filling 28, which additionally prevents the entry of water or dust into the roller bearing.

It will be recognized that a roller as described can be made relatively simply and economically, that its construction is robust and provides good support, that it prevents the entry of dust or water into the roller bearing and into the inside of the roller, and that in addition, it operates for a practically unlimited time, and finally has an aesthetically pleasing, externally smooth appearance which excludes the danger of injuries and the like.

In the roller 10' represented in FIG. 2, the roller bottoms 14' are of metal. Similar parts have been given the same reference figures in the forms of execution according to FIGS. 1 and 2, and therefore need not be commented on again. Thus, in particular, the dust cover 24 is identical in both examples of execution.

The roller bottom 14' has in FIG. 2 a semi-cross-section of substantially Z-shape, where the external flange 32 of the Z fits into the end of the roller casing 12, while the internal flange 34 of the Z bears the external roller bearing ring 15 and at the same time forms with its free end the water-deflector annular flange 35.

Such a metal roller bottom 14' may be formed by pressing from one piece of metal, when indeed the Z-strap 33 flows in pronounced manner inwardly. However, this is not in any way a drawback as the dust cover 24 covers this hollow space.

What is claimed is:

1. A roller assembly for conveyor installations comprising a tubular roller casing, roller bearings, a roller bottom secured in each end of said roller casing, a non-rotatable shaft and a dust cover;

said roller bottom including an integral annular flange protruding axially outwardly from the assembly and angled radially outward at its free end to serve as a water deflector;

said dust cover having a series of inwardly extending flanges the first of said flanges being affixed to said shaft with said roller bearing attached thereto, the second of said flanges resiliently sealingly engaging the underside of said roller bottom flanges, said engagement allowing rotational movement of said roller bottom, and at least one baffling flange at the top of and extending beyond the edge of said roller bottom flange with said baffling flange not in contact with said roller bottom flange.

2. A roller assembly as claimed in claim 1, wherein said roller bottom is formed of metal and has a semi-cross-section of substantially Z shape, one flange of said Z being adapted to engage the inner surface of said roller casing, and the other flange of said Z forming with its free end, said integral annular flange to provide water deflection and providing a mounting for the external ring of a roller bearing.

3. A roller assembly as claimed in claim 1, characterized in that the water-deflecting annular flange at the roller bottom, the first and second flanges of the dust cover, and the roller bearing form a generally ring-shaped grease chamber.

4. A roller assembly as claimed in claim 1, wherein said roller bottom includes a radial annular flange extending over the inner side of the roller bearing.

* * * * *